(12) United States Patent
Heyner

(10) Patent No.: US 10,410,212 B2
(45) Date of Patent: *Sep. 10, 2019

(54) SECURE TRANSACTION OBJECT CREATION, PROPAGATION AND INVOCATION

(71) Applicant: Institutional Cash Distributors Technology, LLC, Palos Verdes Estates, CA (US)

(72) Inventor: Mark A. Heyner, Evergreen, CO (US)

(73) Assignee: INSTITUTIONAL CASH DISTRIBUTORS TECHNOLOGY, LLC, Palos Verdes Estates, CA (US)

( * ) Notice: Subject to any disclaimer, the term of this patent is extended or adjusted under 35 U.S.C. 154(b) by 1683 days.

This patent is subject to a terminal disclaimer.

(21) Appl. No.: 13/888,233

(22) Filed: May 6, 2013

(65) Prior Publication Data

US 2013/0317990 A1    Nov. 28, 2013

Related U.S. Application Data

(60) Provisional application No. 61/643,195, filed on May 4, 2012.

(51) Int. Cl.
   *G06Q 20/38* (2012.01)
   *G06F 21/60* (2013.01)
   *H04L 9/32* (2006.01)

(52) U.S. Cl.
   CPC ......... *G06Q 20/3829* (2013.01); *G06F 21/60* (2013.01); *H04L 9/321* (2013.01); *H04L 9/3234* (2013.01); *H04L 9/3247* (2013.01); *H04L 2209/56* (2013.01)

(58) Field of Classification Search
   None
   See application file for complete search history.

(56) References Cited

U.S. PATENT DOCUMENTS

| | | | | |
|---|---|---|---|---|
| 5,276,444 A | * | 1/1994 | McNair | G07C 9/00103 340/5.21 |
| 5,557,518 A | * | 9/1996 | Rosen | G06Q 20/02 705/69 |
| 5,659,616 A | * | 8/1997 | Sudia | G06Q 20/341 705/76 |
| 5,671,279 A | * | 9/1997 | Elgamal | G06Q 20/02 380/29 |

(Continued)

OTHER PUBLICATIONS

Kiran et al (Building Robust m-Commerce Payment System on Offline Wireless Network) Published in: 2011 Fifth IEEE International Conference on Advanced Telecommunication Systems and Networks (ANTS) pp. 1-3) (Year: 2011).*

*Primary Examiner* — Mamon Obeid
(74) *Attorney, Agent, or Firm* — Barnes & Thornburg LLP

(57) ABSTRACT

Functional data of a cash channel is encapsulated by at least two parties in succession to define an at least twice-encapsulated data object. The encapsulation and subsequent de-encapsulation can utilize digital signature systems of the parties that involve a private key for encapsulation and a public key for de-encapsulation. If constructed carefully over a series of rigorous events, the resulting at least twice-encapsulated data object can be practically impossible to counterfeit. In addition, a propagation of rights can be tracked for auditing and rights can be easily terminated or modified.

45 Claims, 5 Drawing Sheets

(56) References Cited

U.S. PATENT DOCUMENTS

| | | | | |
|---|---|---|---|---|
| 5,677,955 A * | 10/1997 | Doggett | G06Q 20/02 | 235/379 |
| 5,784,463 A * | 7/1998 | Chen | G06F 21/33 | 380/282 |
| 5,790,677 A * | 8/1998 | Fox | G06Q 20/00 | 380/277 |
| 5,794,207 A * | 8/1998 | Walker | G06Q 10/02 | 705/77 |
| 5,910,987 A * | 6/1999 | Ginter | G06F 21/10 | 348/E5.006 |
| 5,943,423 A * | 8/1999 | Muftic | G06F 21/33 | 705/58 |
| 5,995,625 A * | 11/1999 | Sudia | G06F 21/6209 | 705/51 |
| 6,029,150 A * | 2/2000 | Kravitz | G06Q 20/02 | 705/39 |
| 6,189,103 B1 * | 2/2001 | Nevarez | G06F 21/128 | 726/5 |
| 6,212,504 B1 * | 4/2001 | Hayosh | G06Q 20/042 | 235/375 |
| 6,327,578 B1 * | 12/2001 | Linehan | G06Q 20/02 | 705/65 |
| 6,523,012 B1 * | 2/2003 | Glassman | G06Q 20/02 | 705/75 |
| 6,658,568 B1 * | 12/2003 | Ginter | G06F 21/10 | 348/E5.006 |
| 6,959,382 B1 * | 10/2005 | Kinnis | G06F 21/602 | 713/168 |
| 7,069,443 B2 * | 6/2006 | Berringer | G06F 21/64 | 713/175 |
| 7,103,575 B1 * | 9/2006 | Linehan | G06Q 20/12 | 235/379 |
| 7,177,847 B2 * | 2/2007 | Atkinson | G06Q 20/367 | 705/65 |
| 7,188,003 B2 * | 3/2007 | Ransom | H04L 63/20 | 700/22 |
| 7,290,138 B2 * | 10/2007 | Freeman | H04L 9/3247 | 713/167 |
| 7,580,988 B2 * | 8/2009 | Rudd | G06F 21/6209 | 709/217 |
| 7,587,368 B2 * | 9/2009 | Felsher | G06F 19/328 | 705/65 |
| 7,631,188 B2 * | 12/2009 | Valente | H04L 9/3265 | 380/232 |
| 7,644,037 B1 * | 1/2010 | Ostrovsky | G06Q 20/04 | 705/30 |
| 7,904,722 B2 * | 3/2011 | Sudia | G06Q 20/401 | 713/156 |
| 8,055,589 B2 * | 11/2011 | Saito | G06Q 20/3821 | 705/12 |
| 8,060,931 B2 * | 11/2011 | Dillaway | G06F 21/6218 | 726/10 |
| 8,095,969 B2 * | 1/2012 | Dillaway | H04L 63/20 | 709/225 |
| 8,225,378 B2 * | 7/2012 | Dillaway | G06F 21/6218 | 713/155 |
| 8,275,672 B1 * | 9/2012 | Nguyen | G06Q 30/0635 | 705/26.41 |
| 8,316,237 B1 * | 11/2012 | Felsher | H04L 9/0825 | 380/282 |
| 8,341,045 B2 * | 12/2012 | Kravitz | G06Q 20/06 | 705/35 |
| 8,556,164 B1 * | 10/2013 | Freedman | G06Q 30/0207 | 235/375 |
| 8,566,596 B2 * | 10/2013 | Stephenson | H04W 4/21 | 713/176 |
| 8,656,503 B2 * | 2/2014 | Becker | G06F 21/6236 | 726/27 |
| 8,682,802 B1 * | 3/2014 | Kannanari | G06Q 20/367 | 705/64 |
| 8,688,589 B2 * | 4/2014 | Cronic | G06Q 20/40 | 705/44 |
| 8,700,509 B2 * | 4/2014 | Heyner | G06Q 40/06 | 705/35 |
| 8,719,165 B2 * | 5/2014 | Roy | G06Q 20/32 | 705/41 |
| 8,938,783 B2 * | 1/2015 | Becker | G06F 21/62 | 726/4 |
| 9,094,212 B2 * | 7/2015 | Thomas | H04L 9/3234 | |
| 9,189,777 B1 * | 11/2015 | Dickinson | G06F 21/31 | |
| 2001/0005839 A1 * | 6/2001 | Maenpaa | G06Q 20/367 | 705/65 |
| 2002/0007343 A1 * | 1/2002 | Oyama | G06F 21/33 | 705/39 |
| 2002/0013898 A1 * | 1/2002 | Sudia | G06Q 20/02 | 713/155 |
| 2002/0133467 A1 * | 9/2002 | Hobson | G06Q 20/02 | 705/64 |
| 2002/0184517 A1 * | 12/2002 | Tadayon | G06F 21/10 | 726/27 |
| 2003/0074271 A1 * | 4/2003 | Viswanath | G06Q 30/06 | 705/26.81 |
| 2003/0074273 A1 * | 4/2003 | Miller | G06Q 30/06 | 705/26.1 |
| 2004/0073518 A1 * | 4/2004 | Atkinson | G06Q 20/367 | 705/65 |
| 2004/0073801 A1 * | 4/2004 | Kalogridis | G06F 21/305 | 713/176 |
| 2004/0111375 A1 * | 6/2004 | Johnson | G06Q 20/06 | 705/64 |
| 2004/0181818 A1 * | 9/2004 | Heyner | H04H 20/38 | 725/146 |
| 2004/0243811 A1 * | 12/2004 | Frisch | H04L 9/3297 | 713/176 |
| 2005/0033813 A1 * | 2/2005 | Bhogal | G06F 17/24 | 709/206 |
| 2005/0102188 A1 * | 5/2005 | Hutchison | G06Q 20/02 | 705/39 |
| 2005/0119978 A1 * | 6/2005 | Ates | G06Q 20/04 | 705/67 |
| 2006/0080546 A1 * | 4/2006 | Brannon | G06F 21/6218 | 713/185 |
| 2006/0168663 A1 * | 7/2006 | Viljoen | G06Q 30/06 | 726/27 |
| 2007/0198434 A1 * | 8/2007 | Jang | G06F 21/10 | 705/67 |
| 2007/0199057 A1 * | 8/2007 | Plummer | G06F 21/52 | 726/9 |
| 2007/0245158 A1 * | 10/2007 | Giobbi | G06F 21/31 | 713/186 |
| 2007/0271149 A1 * | 11/2007 | Siegel | G06Q 30/0603 | 705/26.41 |
| 2008/0046718 A1 * | 2/2008 | Grab | G06F 21/10 | 713/156 |
| 2008/0066159 A1 * | 3/2008 | Dillaway | G06F 21/62 | 726/4 |
| 2008/0066170 A1 * | 3/2008 | Dillaway | H04L 63/10 | 726/9 |
| 2008/0243702 A1 * | 10/2008 | Hart | G06Q 20/3672 | 705/66 |
| 2008/0263422 A1 * | 10/2008 | Bardouillet | G06F 11/1004 | 714/732 |
| 2008/0283591 A1 * | 11/2008 | Oder, II | G06Q 20/20 | 235/380 |
| 2009/0048940 A1 * | 2/2009 | Hill | G06Q 20/085 | 705/26.41 |
| 2009/0198617 A1 * | 8/2009 | Soghoian | G06Q 20/04 | 705/65 |
| 2010/0049658 A1 * | 2/2010 | Sanchez | G06Q 20/20 | 705/64 |
| 2010/0114739 A1 * | 5/2010 | Johnston | G06Q 30/06 | 705/26.1 |
| 2010/0154040 A1 * | 6/2010 | Chiu | H04L 63/0823 | 726/5 |
| 2010/0251353 A1 * | 9/2010 | Hodgkinson | G06F 21/34 | 726/9 |
| 2010/0306081 A1 * | 12/2010 | Hutchison | G06Q 20/02 | 705/26.43 |

(56) References Cited

U.S. PATENT DOCUMENTS

| | | | |
|---|---|---|---|
| 2011/0093934 A1* | 4/2011 | Le Saint | G06F 21/445 726/5 |
| 2011/0099107 A1* | 4/2011 | Saxena | G06Q 20/108 705/42 |
| 2011/0189981 A1* | 8/2011 | Faith | G06F 1/1694 455/414.1 |
| 2011/0225643 A1* | 9/2011 | Faynberg | G06F 21/31 726/10 |
| 2012/0191979 A1* | 7/2012 | Feldbau | H04L 63/126 713/178 |
| 2013/0007858 A1* | 1/2013 | Shah | H04L 63/0815 726/6 |
| 2013/0013931 A1* | 1/2013 | O'Hare | H04L 9/0822 713/189 |
| 2013/0191884 A1* | 7/2013 | Leicher | H04L 63/08 726/4 |
| 2013/0311294 A1* | 11/2013 | Ward | G06Q 30/0264 705/14.64 |
| 2013/0317990 A1* | 11/2013 | Heyner | G06F 21/60 705/44 |
| 2013/0318619 A1* | 11/2013 | Heyner | G06F 21/60 726/26 |
| 2013/0346112 A1* | 12/2013 | Chasten | G06Q 30/0279 705/4 |
| 2014/0189797 A1* | 7/2014 | Nori | H04L 63/0807 726/4 |
| 2014/0331058 A1* | 11/2014 | Heyner | G06F 21/602 713/185 |
| 2014/0365781 A1* | 12/2014 | Dmitrienko | G06F 21/34 713/185 |
| 2015/0026080 A1* | 1/2015 | Roever | G06F 21/10 705/310 |
| 2015/0142665 A1* | 5/2015 | Dicker | G06Q 20/0453 705/64 |
| 2015/0150110 A1* | 5/2015 | Canning | H04L 63/0807 726/9 |
| 2015/0228039 A1* | 8/2015 | Mahgoub | H04L 63/0823 705/311 |
| 2016/0189136 A1* | 6/2016 | Mercille | G06Q 20/3227 705/44 |
| 2016/0292601 A1* | 10/2016 | Pakanathi | G06Q 10/06311 |
| 2016/0352827 A1* | 12/2016 | Procopio | H04L 67/1095 |
| 2018/0196950 A1* | 7/2018 | Heyner | G06F 21/602 |

\* cited by examiner

Portal Transaction History

SECURE TRANSACTION OBJECT CREATION, PROPAGATION AND INVOCATION

RELATED APPLICATION INFORMATION

This application claims priority from U.S. Provisional Patent Application No. 61/643,195, entitled, "SECURE TRANSACTION OBJECT CREATION, PROPAGATION AND INVOCATION," filed on May 4, 2012, the contents of which are incorporated herein by reference. This application is being filed concurrently with U.S. patent application Ser. No. 13/888,322 [not yet assigned], entitled "ENCAPSULATED SECURITY TOKENS FOR ELECTRONIC TRANSACTIONS," which includes related subject matter. That application is also incorporated herein by reference.

FIELD OF THE INVENTION

The present invention relates to establishing and using a cash channel for electronic funds transfers and, in particular, is intended to efficiently and securely establish, manage and track authorizations or any other rights related to such cash channels, as well as invoking or otherwise using the cash channel in connection with electronic funds transfers.

BACKGROUND OF THE INVENTION

In many different contexts, it would be useful to have a flexible and efficient mechanism for securing a transaction process by protecting and proving the authorization for, validity of and integrity of functional data involved in the transaction process. The contexts of such transaction processes extend across a wide variety of civil, commercial and other applications. For example it may be desired to protect a critical information object, such as a citizen's vote, through a series of propagation steps from polling place to central tally, so as to prevent election fraud and provide transparency and auditability. As another example, it may be desired to protect a personal identifier, such as an email address, by limiting the propagation of authorization to use that address, thereby preventing unwanted spam email. The need to protect proprietary data is also apparent in relation to transactions involving a monetary exchange.

The case of protecting data relating to invoking or using a cash channel is illustrative. A cash channel is a set of authorizations and rights, and associated computer-controlled communications pathways, that permits one or more electronic fund transfers from an origination financial account (such as a bank account having cash assets) to a destination financial account. Cash channels are used in a variety of contexts. One such context relates to executing transactions of financial instruments such as buying and/or selling of securities, funds (e.g., money market funds), or the like. Such transactions generally involve a trade contract and a settlement. The trade contract generally identifies the purchaser/seller, the asset, the quantity at issue (e.g., number of shares), the price, the accounts involved, and any other terms defining the trade. Settlement typically involves reciprocal transfer of shares traded and corresponding transfer of funds. The transfer of funds is generally accomplished by electronic funds transfer using a specified cash channel. It is important that this transfer of funds using the cash channel be accomplished securely and in strict compliance with authorizations governing the cash channel.

Conventionally, such transactions have been securely executed by requiring the owner of the originating account to specifically and directly authorize each transfer of funds from that account. Thus, a purchase transaction can be accomplished as follows. A purchaser first accesses a trade portal to request a purchase, generally identifying the financial instrument desired and a quantity, e.g., in terms of shares or monetary units. The portal can then negotiate with the seller (or its agent) a purchase based on current market conditions. This negotiation results in a generation of a purchase ticket or contract. Based on applicable trading rules and regulations, shares of the financial instrument are transferred to an investment account of the buyer, and funds are transferred from a cash account of the buyer to a cash account of the seller.

The latter transfer generally requires a specific funds transfer request from the buyer (or its agent). Accordingly, details of the transaction, generally including the originating account, the destination account and the amount of the transfer, must be provided together with verifiable authorization information.

This process can be cumbersome and risky. It can be cumbersome because much of the same information generated in connection with entering the trade contract may need to be re-entered in connection with using the cash channel to transfer settlement funds. It can be risky because the repeated entry of this information can lead to data entry errors. Additional risks are involved when trusting a buyer's agent to execute such a request. Whether requested by a buyer or by a buyer's agent, the process itself entails cyber security risk if executed electronically. In the case of corporate treasurers executing large transactions on behalf of the company, errors in this process can involve substantial assets.

SUMMARY OF THE INVENTION

The present invention provides a mechanism for verifying authorizations, allowing authorizations or other rights to be propagated, tracking authorizations and rights, and modifying or curtailing authorizations to the systems of interest. References below to "authorizations" are for purposes of convenience and are not intended to exclude other rights or limitations that may be propagated with respect to a transaction process, except where such exclusion is indicated by context. Moreover, while the invention is described with specific references to propagating authorizations with respect to cash channels, various aspects of the invention are applicable in other contexts where it is desired to securely propagate rights via electronic messaging, including, for example, any of the transaction process contexts noted above.

In one example, referenced herein as the "cash channel embodiment," the core functional data may define at least in part an identifiable cash channel. The core functional data may be encapsulated (e.g., signed or sealed using a digital signature system) by at least two parties in succession (e.g., an original grantor of rights and an intermediate grantee/grantor) to define an at-least-twice-encapsulated data object, with one encapsulated object nested inside the next. In this same manner, the data object may also encode identification information for an authorized party (e.g., the grantee), as well as propagation information tracing a source of the authorization. Such authorization may be further propagated to authorized parties. Each successive iteration encodes the propagation of that authorization, over time and from one entity to the next, as required to support secure legitimate usage of the functional data and associated asset. The successive iterations can collectively encode, over various iterations, additional functional details that will ultimately comprise a transaction involving the core functional data. In the case of the cash channel embodiment, these additional functional details may include trading account numbers, authorized entity IDs, transaction dates and transaction amounts. By spreading these details out, over time and in a rigorous succession of propagation events, one can significantly reduce the possibility of fraud, because the fraudster would need to both a) understand the complete rigorous process, and b) possess all digital signatures, for that entire chain of events. Consequently, the data object is like a chain that increases in strength with length, i.e. with the number of propagation events/links. The further the chain extends from the core functional data owner or owners, the stronger it becomes. Indeed, a security protocol may specify a minimum number of links (and parameters thereof such as independence of links/diversity of digital signature sources) and intermediaries may be utilized for the purposes of lengthening the chain.

In one implementation of the cash channel embodiment, the invention allows for convenient and secure establishing, verifying, managing, and tracking of authorizations related to cash channels. The invention leverages existing public/private key digital signature systems over a series of propagation events in which proprietary cash channel functional data elements are serially linked or encapsulated to produce a secure transaction object that is extraordinarily difficult if not practically impossible to counterfeit. Moreover, the secure transaction object is easy to use, is compact, can be propagated to additional authorized users or entities, and is flexible in terms of allowing for specification of and limits to rights with respect to the cash channel. Moreover, the invention is not limited to contexts where authorizations are propagated in linear fashion and secure transaction objects are subsequently invoked, but encompasses scenarios where multiple independent authorizations become encapsulated in a single secure transaction object, thus defining complex interlinked networks of authorization and transaction approval.

In accordance with the present invention, a data object is produced by iteration of digital signatures over time. At the core of the data object lies an authorization, digitally signed by the owner of one or more functional data elements, for another entity to invoke those functional data elements in a transaction involving those functional data elements. Functional data elements may be added by different actors in a chain-of-custody of the evolving data object, and there may be multiple owners or controllers of discrete elements of functional data.

A number of metaphors are used herein to assist in conceptualizing and understanding the invention and, in some cases, theses metaphors get mixed. In this regard, the term "encapsulate" is sometimes used to describe the process by which a party signs or seals (or otherwise associates authenticatable indicia with) an object in connection with propagating rights. For example, this may involve appending a description of rights granted (or limitations thereof) to the data object, digitally signing the data object (and any appended information), and associating with the object information sufficient to enable de-encapsulation (digital signature verification) by authorized parties (e.g., identifying a public key). As the object is propagated through a series of parties, the data object accumulates layers of encapsulation and appended data. "Encapsulation" is thus an apt metaphor for understanding such layering of the object, though encapsulation is not limited to any particular data structure.

The "chain" metaphor is useful in conveying the concept of propagation of rights. In the cash channel embodiment, rights to a cash channel may be granted, for example, for the objective of settling a trade contract by transferring funds from a source account (e.g., of a buyer) to a destination account (e.g., of a seller). A number of parties may be involved in this transfer including one or more employees or agents of an institutional buyer, one or more employees or agents of an institutional seller, and employees or agents of various intermediaries. Generally, in such a case, the relevant rights or authorizations originate with the owner of the source account and propagate, in serial fashion, across the relevant parties at least to the party that will initiate the transfer of funds, and perhaps further to the ultimate beneficiary, e.g., the owner of the destination account. A chain is an apt metaphor to describe this propagation of rights in connection with the data object.

However, interaction with the data object is not limited to a linear propagation of rights. For example, a single core object defining (at least in part) a specific cash channel can comprise the initial link in multiple propagation chains involving multiple trading accounts and multiple individuals authorized to initiate transactions for those trading accounts, thereby facilitating use of the same cash channel to settle transactions executed in many different contexts. Further, different parties may interact with the corresponding objects at any level of propagation for various purposes including verifying the authenticity of the data object, invoking the cash channel or other underlying asset, tracking a chain of authorizations, etc. A complex network of authorizations and interactions may thus be defined. This network can grow and be pruned as desired. The tree metaphor is thus apt to describe the complex structure and management of such non-linear transaction networks.

In accordance with one aspect of the present invention, a method and system ("utility") is provided for creating a secure data object that can be used to control operation of a cash channel. In this regard, controlling the cash channel includes one or more of activating the cash channel, authorizing transaction rights with respect to the cash channel, invoking transaction rights with respect to the cash channel, and auditing transactions involving the cash channel. The secure transaction object authenticates that rights to control the cash channel, at least in some identified respect, have been granted by a grantor (e.g., an originating account owner) to a grantee (e.g., a trade portal operator or agent of the originating account owner who may also become a grantor of rights to a further party). As will be appreciated from the description below, the invention can be implemented in various ways and the identity of the "grantor" and "grantee" varies depending on context. The utility involves initially establishing a core data object defining (at least in part) a cash channel. In this regard, the core data object may include functional data elements such as an identification of an origination financial account (e.g., a cash bank account) from which cash assets are to be withdrawn, an identification of a destination account to which cash assets are to be deposited, an identification of both accounts or other information.

For example, the origination and destination accounts may be identified via an appropriate interface of a computer-based application running on an appropriate application platform, e.g., associated with a web-based server of the grantor or another party. The account information can be accessed by the grantor in a specially-prepared data file, or conveniently selected from a pull-down menu or other directory to reduce the opportunities for data entry errors.

The resulting core functional data elements can be any appropriate data objects such as character strings or files, and may include the noted account identifications, metadata describing or classifying the account identifications and other data as desired. These core functional data elements are useful to allow a grantor, such as an owner of the originating account or one otherwise having authority, to grant rights with respect to the cash channel to a grantee. In certain specific examples disclosed below for purposes of illustrating the invention, the grantee is the operator of a portal (e.g., Institutional Cash Distributors Holdings, LLC) used to make investments in fixed income products such as money market funds, and the grantor is a customer of the portal who will typically have multiple accounts managed or accessed by the portal, in accordance with the present invention, including investment accounts holding financial instruments and cash accounts (e.g., of a bank or other financial institution). However, it should be appreciated that this aspect of the invention is applicable in any context where the grantor grants rights to a grantee concerning a cash channel or other asset used in connection with a financial transaction.

The noted utility may in some contexts further involve establishing a once-encapsulated cash channel object that essentially represents a request by a would-be-grantee for authorization from a grantor. This could be done for example by processing the core data object to apply a digital signature or fingerprint of the grantee to the core data object, thereby signifying willingness of the grantee to receive a grant of rights with respect to the cash channel in the context of this aspect of the invention. In particular, the core data object can be scrambled using a private key provided to the grantee through a public key/private key digital signature system. The once-encapsulated cash channel object thus comprises a scrambled version of the core data object specific to the grantee's private key. Sufficient information to identify the grantee's corresponding public key can then be tagged to (e.g., included in an electronic message stream with) the once-encapsulated object and form an integral part thereof, or can otherwise be made available for downstream users. Additionally or alternatively, the tag may include the date and time the once-encapsulated cash channel object was created and/or contact information for the grantor.

A twice-encapsulated cash channel object can then be established by applying a digital signature or fingerprint to a copy of the once-encapsulated object. For example, a copy of the once-encapsulated object may be provided to the grantor (located at the same location or a different location than the grantee and using the same machine or a different machine) who can scramble the copy of the once-encapsulated object using the grantor's private key. Optionally, before such further scrambling, the grantor may verify the copy of the once-encapsulated object by unscrambling the copy of the once-encapsulated object using the grantee's public key and matching one or more attributes of the core data object (e.g., the destination account) to the desired cash channel. In addition, the grantor may append information to the copy of the once-encapsulated object (e.g., by appending a data string to the once-encapsulated object) prior to further scrambling. Such appended information may, for example, specify a remaining endpoint of the cash channel, identify the grantee's public key, identify the grantee or define the rights granted or restrictions thereof. The resulting twice-encapsulated object may thus comprise a scrambled version of the copy of the once-encapsulated object and any appended information. The grantor's public key or sufficient information to locate that public key can then be tagged to the twice-encapsulated object and form an integral part thereof, or can otherwise be made available to downstream users. Additionally or alternatively, the tag may include the date and time that the at least twice-encapsulated object was established and/or contact information for the grantor. In other implementations of the cash channel embodiment, the two layers of encapsulation described can be applied in the reverse order, and/or applied as part of a larger series of encapsulation events, in whatever sequence is desired. It will be appreciated that copies of the data object will typically be generated in the process of propagation of the data objects and references to such data objects include copies of the objects.

The twice-encapsulated cash channel data object is a secure data object that can then be used for controlling operation of or invoking the cash channel. Invoking a cash channel may involve several actors in a chain of communication. For example, a portal (e.g., grantee) may transmit a transaction message directing funds to be transmitted from an originating account to a destination account in settlement of a trade. The portal may utilize a secure messaging service, such as the SWIFT™ system, to invoke the financial institution governing the originating account. Thus, the messaging sequence may involve a processing platform of the portal, a processing platform of the secure messaging service and a processing platform of the financial institution among other possible platforms and associated actors. Moreover, the data object may be transmitted between internal platforms of entities along the communication route, e.g., between a corporate treasurer's terminal and a subordinate account manager's terminal within an entity. Functional data elements describing the cash channel for the transaction can be included with the cash channel data object to facilitate verification of authorization at any point in the transaction process or auditing thereof.

The twice-encapsulated cash channel object can be processed further to securely and conveniently propagate rights to all desired actors along this chain and to subsequently invoke the cash channel or verify transaction requests at any point along the chain. Rights can be propagated by successively further encapsulating copies of the twice-encapsulated cash channel object with digital signatures or fingerprints that correspond to the hierarchy or sequence by which rights are granted with respect to the cash channel. In this manner, rights can be propagated to the complete set of authorized actors in advance of any desired invocation of rights. For example, if a corporate treasurer has authority to grant rights to an account manager, who in turn has authority to grant rights to an investment portal, who has authority to access a secure messaging service, who will invoke the financial institution of the originating account, a copy of the multiply-encapsulated cash channel object (initially the twice-encapsulated cash channel object) can be scrambled further with an authorization digital signature or fingerprint at each successive level of this authorization hierarchy as part of the rights propagation process. Specifically, at each level, the actor can receive a copy of the multiply-encapsulated cash channel object, optionally verify the copy of the multiply-encapsulated cash channel object by unscrambling down to the core object and matching one or more of the cash channel data elements embedded in the object to the cash channel at issue, optionally append additional data elements such as authorization data identifying each subsequent grantee and its rights, and scramble the copy of the multiply-encapsulated cash channel object and any appended data to produce a propagated cash channel object.

The propagated cash channel object at each level is a secure transaction object that can be used by the grantee to invoke rights to the cash channel.

Moreover, at any point along the chain of propagation, the cash channel data object can be inspected or verified by authorized users. This can be accomplished by unscrambling the cash channel object by successively using the public keys of each preceding grantor to reveal the transaction data elements all the way down to the core object. In the case of a funds transfer request, for example, a cash channel destination account identifier included in the core data object or appended within a subsequent layer of encapsulation can then be matched to the destination account of the funds transfer request, to verify or authenticate the request. This unscrambling and verification can be performed by logic locally resident at the verifying actor's platform, at another actor's platform, and/or at any trusted party's platform. It is anticipated that the entire chain of propagation may be validated by simply having the secure messaging service's platform access a utility of the original grantee's (e.g., the investment portal) platform to obtain a binary verification decision prior to invoking the financial institution of the originating account. That is, it is expected that it will be sufficient to perform verification with respect to the endpoints of the chains of propagation secured by the method of encapsulation. It should be noted however, that verifications may be conducted at various points along the chain, and may be conducted by parties (e.g., administrators or supervisors) who are not directly within the chain of propagation (who may, for example, view a copy of the twice-encapsulated—and perhaps further encapsulated—cash channel object). The system is thus secure and in operation, agile in relation to accommodating evolving authorizations, and efficient in relation to the size and structure of the cash channel objects required, even in the case of complex hierarchical authorization structures. The system also allows for convenient changes to, or revocations of, individual authorizations or families of related authorizations, e.g., in the case of institutional changes, attempted frauds, or expirations of authorizations.

It will be appreciated that the present invention encompasses systems, system components and functionality implemented by any of the actors associated with a transaction (e.g., data object creation, data object verification, cash channel invocation, cash channel management system, auditing, propagation of rights, revocation of rights, etc.) or combinations thereof. For example, the invention encompasses: a utility for creating a once-encapsulated data object as described above; a utility for receiving a once-encapsulated data object and creating a twice-encapsulated data object; a utility for receiving and processing a twice (or more) encapsulated data object; a utility for controlling a cash channel using a twice (or more) encapsulated data object; a utility for auditing a transaction or transactions using a twice (or more) encapsulated data object; a utility for tracking a propagation of rights or transaction processing stream using a twice (or more) encapsulated data object; and a utility for combining any two or more of the forgoing. Still further aspects of the present invention will be apparent upon consideration of the description below.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

Figure 1:
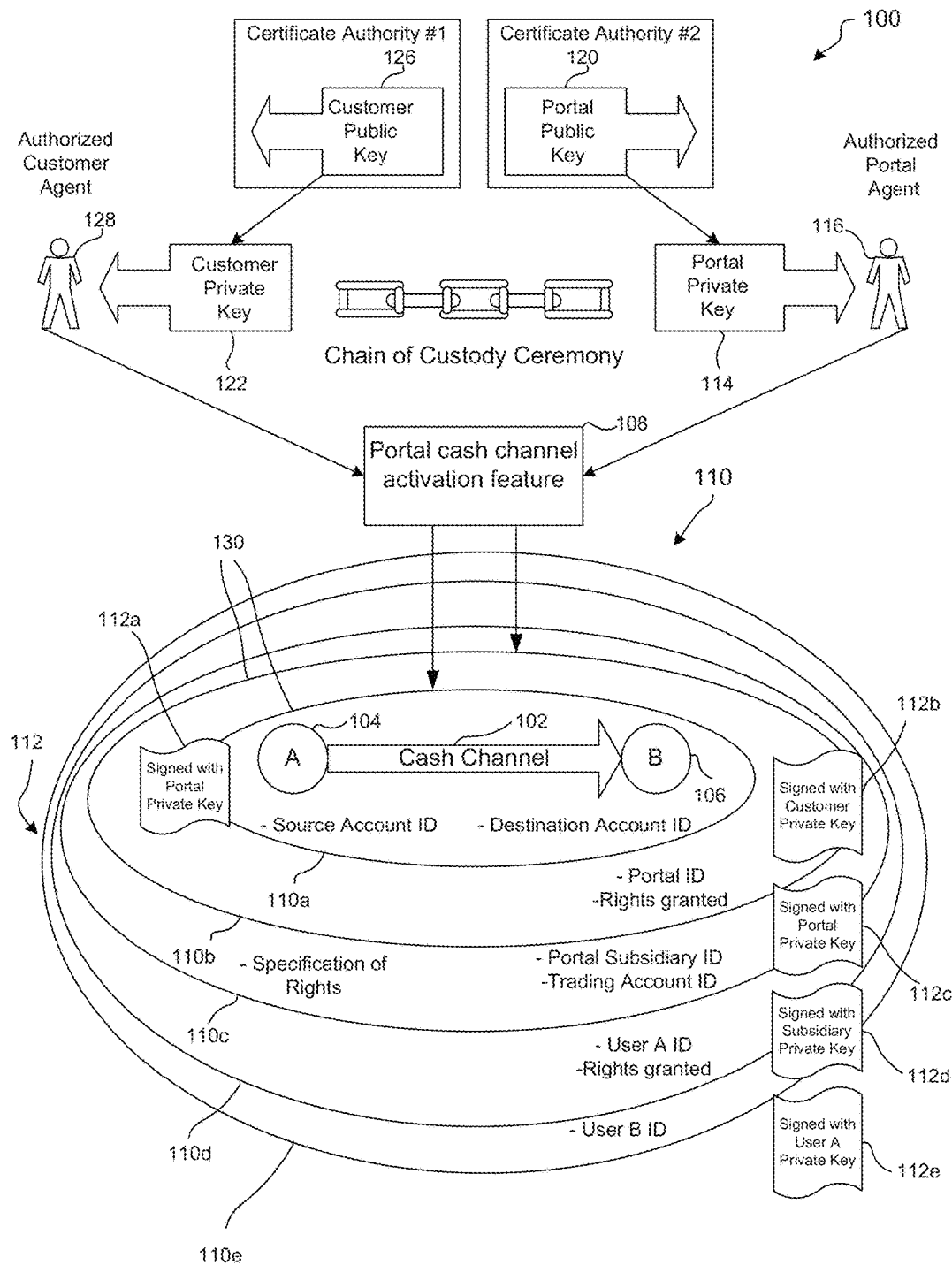
FIG. 1 is a schematic diagram of a cash channel embodiment of the present invention.

The present invention encompasses processing systems, data structures and associated methodology implemented in connection with any platform implicated in the linear or complex chain (e.g., grantor, grantee, subgrantee and/or auditor) involved in the transaction process as well as processing systems, data structures and associated methodology implemented by any combinations of such platforms. As noted above, such transaction processes, and the present invention, may be implemented in a variety of contexts including civil, commercial and other applications. In the following description, the cash channel embodiment of the invention is further described in relation to the specific business context 100 of an investment and risk management portal as illustrated in FIG. 1. However it should be noted that this is an exemplary implementation and the invention is not limited to this context.

As shown in FIG. 1. a corporate customer using customer processing platform 101 authorizes the portal operator using portal processing platform 103 (or "portal" for short) to trigger cash movements, to settle a transaction on the corporate customer's behalf, by securely activating and propagating rights for a specific cash channel 102, each cash channel comprising a specific origination or source bank account 104 (e.g. corporate customer's cash account) and a specific destination bank account 106 (e.g. beneficiary's destination bank account). Secure activation of the cash channel 102 requires, in this implementation of the cash channel embodiment, one authorized representative from the portal and one authorized representative from the customer, and involves coordinated use of a cash channel activation feature 108 in the portal (this coordinated use is referred to as the "ceremony"). This initial ceremony produces cash channel objects 110a and 110b, which encapsulate identifying information for the origination and destination bank accounts with successive digital signatures 112a and 112b applied by the respective representatives, as described below. The various cash channel objects are generally referred to by reference numeral 110 and the digital signatures or signature tags are indicated by reference numeral 112, with specific instances thereof designated by letters.

First, using the portal's private key 114, the portal (via an authorized agent 116) signs a cash channel core information object comprising information for the origination and destination bank accounts, producing a once-encapsulated object 110a representing the cash channel 102. The portal associates a signature tag 112a with the object 110a that identifies the portal public key 120. Additionally or alternatively, the tag may include a date and time of encapsulation and/or contact information for an authorized party.

Second, the customer unscrambles the object 112a using the portal's public key 120, and optimally validates the information for the origination and/or destination bank accounts. It will be appreciated that this validation step may be skipped at some or all of the modes through which the object 110a is propagated. In practical implementations, validation may occur only at the final step of the transaction.

Third, the customer, using the customer's private key 122, applies a second signature to the object 110a, to produce a new twice-encapsulated object 110b. Object 110a can be combined with other elements prior to the customer signature, such as: the tag 112a identifying the portal's public key or other information identifying the portal, and/or a specification of rights granted to the portal (or to any other entity(ies) identified) for the cash channel 102. The resulting object 110b is associated with a signature tag 112b that identifies the customer public key 126.

The signatures 112 described could be traditional signatures which are furnished together with an unsigned copy of the object contents (to compare the signed and unsigned portions). However, the signatures could be furnished at one or more levels without an unsigned copy of the object contents (the point being to minimize the size of 110) by simply scrambling an object with the private key and provide sufficient tagging 112 with the scrambled object to identify the signer's public key. This is possible because the cash channel being activated, when ultimately invoked, must be invoked using matching origination and destination bank account identification that will be found when the object 110b is unscrambled to the core.

A defining characteristic of these signatures 112a and 112b applied using private keys 114 and 122, respectively, is that the resulting objects 110a and 110b can be unscrambled with (and ONLY with) the corresponding public keys. The existing public key infrastructure (PKI) & service providers furnish key pairs that satisfy this defining characteristic. It will be appreciated that when these keys are used for signatures in this fashion, the keys encode a chain of custody (and, therefore, a branch, sub-branch, etc. of a propagation tree) of the core functional data; in this case, information defining (at least in part) a cash channel.

The signatures 112 described above, applied using private keys and verified using public keys, could rely on any PKI provider. However, security best practices would dictate that the portal representative and customer representative signatures leverage distinct PKI providers. In that case, a breach of object 110b would require compromising two distinct PKI providers (multiplying two tiny probabilities makes an even tinier probability), among other great feats. A similar ceremony can be used for a customer representative to grant cash channel rights to other customer representatives (e.g. to a customer's "Account Master" for the portal).

The cash channel activation feature can be used in combination with a set of related and supporting features, as set forth in the following sections:

Cash Channel Binding to Trading Channels

The same cash channel may be used to settle transactions for multiple trading accounts or trading channels. The process by which the cash channel is linked to and authorized for use with one or more trading channels is referred to herein as "binding." Binding may be done, for example a) in conjunction with the initial cash channel activation ceremony, b) as a subsequent administrative function, or c) in conjunction with propagating rights for specific trading channels. Such binding can apply another layer of signature 112c to a combination of object 110b (for example) and additional information to produce a new object 110c. The additional information could include: the tag 112b identifying the customer public key 126; trading account identification information; a specification of rights propagated for the cash channel and/or trading channel; and/or identification of the party(ies) to whom rights are being granted, such as a subsidiary of the portal that services the specified trading account. This digital signature 112c could be applied by any entity to whom 110b has been granted. The resulting object 110c is associated with a signature tag identifying the public key of the entity that applied the digital signature.

Propagating Authorization

Authorization to invoke cash channels can be in propagated independently of, in conjunction with, or in addition to granting or propagating trading channel authorization. In FIG. 1 the chain of propagation is encoded by additional layers of digital signatures 112d and 112e used to create additional data objects. In each case the party propagating rights applies a signature 112d and 112e, using their private key, to the objects 110c and 110d respectively, by which those rights were granted, to thereby create new objects 110d and 110e respectively. The rights propagated can be equivalent to or narrower than the rights held by the grantor, but can never be broader than the rights held by the grantor, (hence can never be broader than the cash channel rights originally granted by the customer representative in the original activation ceremony, or the trading channel rights granted at binding).

Encapsulating Transaction Requests

Transaction requests can be encapsulated with rights of the requestor. This is achieved by the requestor applying a signature, using the requestor's private key, to a combination of an object such as 110b, 110c, 110d or 110e and the details of one or more transactions, to produce a new object. The encapsulated request could also propagate this authorization to an agent such as the portal to execute the transaction. Alternatively, the rights to execute a transaction (e.g. to fulfill a transaction with a cash settlement) could have been granted to an agent independently of the transaction request.

Cash Distribution Tracing

In many cases, such as auditing and fraud investigation, it is desirable to follow a money trail. Such cash distribution tracing is enabled by the present invention by using successive encapsulated transaction requests and/or transaction records to capture each discrete cash movement in a chain of successive cash movements. That is, the string of signatures encoded in such a data object reflects the chain of custody of cash distributed via a cash channel. The inventive system is also sufficiently flexible to trace complex transactions where different portions of the funds propagate via different pathways, potentially with many levels of propagation, which can be envisioned as a tree branching into increasingly smaller, discrete cash movements. In this regard, units of currency encapsulated in an original transaction object could be subsequently split, with the various portions being distributed further in a series of cash movements each memorialized in a further-encapsulated object. Cash movements can be tracked to as deeply as counterparties support the encapsulation, with notifications all the way to the base of the cash investment tree and even further to the core of any preceding chain of rights propagation. While only support across all financial industry partners would facilitate full tracing—all the way to "terminal" investments in tangible products and services—of institutional cash distribution, the encapsulated transaction requests provide a straightforward accounting mechanism for achieving it.

This tracking functionality could provide the basis for a new fund model, e.g., a new money market fund model. Funds, generally, are pools of various securities and instruments. When an investor purchases shares of the fund, the investor, in effect, acquires fractional interests in the underlying assets of the fund, thus enabling substantial diversification and risk-spreading. Money market funds are a particular type of fund generally used as a short-term liquidity vehicle and having stringent reporting requirements. The noted tracking functionality could be used to track monetary units as they are invested in the underlying assets of the fund. This would provide a mechanism of executing fund investments, accounting for disposition of investments, and reporting fund status. In the case of money market funds, it would also provide a simple mechanism for satisfying governments reporting requirements.

Validating Authorization

In a variety of scenarios, it is desired to validate authorization with respect to a cash channel. These scenarios include: validation during the customer's trade entry in the portal, to ensure that only authorized parties can request a transaction; validation as a quality control measure prior to cash channel invocation, to ensure that requests have not been tampered with (note that per security best practices this should occur as closely as possible to engaging a third party agent in the transaction process); validation as a compliance check by a third-party agent (e.g. a secure messaging service used for propagating cash movement requests to an origination bank); and/or validation by the origination bank prior to carrying out a requested cash movement. While this validation by the origination bank is optional, security best practices would strongly encourage validation at this point in transaction execution, which would decisively eliminate any possibility of tampering or impropriety between the authorization, the authorized request and the receipt thereof. All of these validation objectives can be achieved, at the relevant link in the chain of propagation, by unscrambling the data object down to the core object and confirming that one or more of the functional data elements (e.g., originating account ID, destination account ID, etc.) match the transaction request or other verification data.

Managing Authorization

Authorizations can be managed through "pruning of rights propagation trees." For example, an active cash channel (memorialized in the core object 110a and activated in object 110b) can be thought of as the "trunk" of a functional data rights propagation tree. The recipient of twice-encapsulated object 110b can propagate rights directly to one or more parties, creating "branches". Those parties can—if granted rights to propagate rights further—propagate their rights to other parties, creating "sub branches". Rights can be invalidated ("pruned") at any branch point, which will in turn invalidate all successive sub-branches. This facilitates total retract-ability, i.e. that a) the customer can invalidate the entire tree by invalidating object 110b or invalidating the certificate used to sign object 110b, or b) the portal can invalidate the entire tree by invalidating object 110a or invalidating the certificate used to sign object 110a. As will be understood from the examples below, more complicated (non-linear) arrangements are possible. In such cases, it is possible to prune branches of the tree without terminating all authorizations.

Secure networks such as the SWIFT™ network, which facilitates e.g. the portal sending a payment trigger to an origination bank on behalf of a portal customer (as characterized above), do not validate counterparties in a transaction beyond the sender (the portal) and receiver (origination bank) of the message. Further, the origination bank in that scenario does not validate the destination bank—they will validate that the sender of the message (the portal) is authorized to send the message on behalf of the customer, and will assume that the contents of the message reflect the desires of the customer. This invention introduces a means to validate the destination bank at any point in the transaction process, built on top of a mechanism for securing the activation of cash channels, in combination with granting rights to invoke that cash channel.

Given sufficiently well-defined data structures and encapsulation protocol, an alternate means of furnishing digital signatures without an unsigned copy of the object contents, and which therefore does not require matching of clear content with scrambled/un-scrambled content at every level, but rather relies on matching of the information supplied at cash channel invocation with information embedded within the multiply-encapsulated authorization object, provides great efficiencies without sacrificing security. The context supplied at invocation of a transaction must track back to matching information encoded at some level in the encapsulated object, such as: the cash channel being invoked in the transaction must match the cash channel at the center of the object; the party requesting the transaction must match the identification encapsulated with the object granting rights to that party; and/or the type of transaction requested must match a specific grant of rights conveyed elsewhere in the encapsulated object and propagated to the requestor.

Cash distribution tracing using this method is not an obvious development. The alternate means of furnishing signatures facilitates this because it packs a lot of information into a very compact object through successive scrambling, and injection of essential data elements only.

Currently the agreements between a bank and a bank account holder (e.g. the portal customer) that grant control of the bank account to a third-party agent or custodian rely on legal terms and conditions and institutional "trust" between the bank account holder and the third party.

The functionality described above solves this problem by isolating the specification of cash channel endpoints to a ceremony controlled at least in part by the customer and multiplying the security of separate PKI infrastructures. Also, the information used to invoke transactions is notoriously difficult to protect and in practice must be routinely made available to clerical employees to carry out transaction processing. This again has been addressed by terms and conditions which would protect a bank account holder in a legal proceeding but may do nothing to prevent abuse to begin with.

The propagation of rights described herein, including the core cash channel object, changes the authorization paradigm completely. It is not sufficient to present the proprietary functional data (such as account identifiers) you're attempting to invoke, but in addition you must present an object that reveals precisely how you acquired the rights to that proprietary functional data.

In summary, the process for granting, propagating and/or exercising rights with respect to a cash channel, as set forth in connection with FIG. 1, proceeds as follows. An authorized customer agent 128 and authorized portal agent 116 participate in a chain of custody ceremony, which could be organized as a single collaborative event or as coordinated distinct events. During that ceremony, one or more cash channels 102 are activated. Each activated cash channel is encoded in a channel object 110b, signed by both parties. The outer signature (the customer signature) 112b is applied to a combination of the core object signed using private key 114, and an identifier for the portal (enables lookup of portal's public key 120). That "cash channel object" 110b encompasses two ellipses 130 in FIG. 1.

In a subsequent operation, a portal administrator grants cash channel rights, in conjunction with binding that cash channel to a trading account, to a subsidiary of the portal that services that trading account. This operation creates another encapsulated and signed trading channel object 110c, signed by the portal, with the contents: the cash channel object 110b created in step 1; identification for one or more trading channels which can use that cash channel; identification for the portal subsidiary; and a specification of rights for cash channel and/or trading channel.

In a subsequent operation, an authorized agent of the portal subsidiary grants cash channel rights, together with rights for the trading channel, to a specific portal user User A. This operation creates yet another encapsulated and signed user object 110d, signed by the portal subsidiary, with the contents: the trading channel object 110c created in step 2; the User ID for User A; and a specification of rights propagated to User A for the cash channel and trading channel. This process can be repeated to further propagate rights to subsequent users (User B, etc.).

When a user approves a transaction/cash movement they present the user object that granted them rights. In a messaging application associated with a transmission method (e.g. SWIFT™ Alliance Integrator or Access), as close as possible to the message emission point, this user object is verified as containing the correct cash channel and trading channel for the transaction, as well as an identifier for the user who requested the transaction. If so, the user object is attached to a payment request message as an audit trail. The user object is stored on the portal side as an audit trail as well. The user object and the transaction/cash movement details can be signed as well, creating a "transaction object" that encapsulates the full chain of propagation of rights that facilitated the transaction/cash movement, and could be provided with the payment request message in place of the user object. A post-process could double-validate the user object or transaction object sent in every payment request message, as soon as the message is transmitted. This failsafe should prevent unauthorized tampering with the message itself and facilitate alarms and immediate cancellation/escalation if any discrepancy is discovered. A similar post-process could be executed by the party (e.g. the originating bank) receiving a payment request message—this would be the most secure implementation.

In the preceding discussion, the path by which authorizations are propagated, and along which rights are invoked and verified, has been referred to metaphorically as a chain and the cash channel object has been illustrated as including a series of layers of encapsulation. However, while rights may be propagated, invoked or verified, in a simple case, with respect to a linear "chain" it is also possible to implement complex, non-linear webs of links in accordance with the present invention. This is illustrated by the examples below.

Security Chains Hypothetical Transaction Example

Security chains provide a means for cash investors to guarantee authorization and integrity of their cash transactions, including complete electronic traceability. The chains are created by cumulatively applying a reversible mathematical function to a growing set of information over a series of routine business events. Each resulting set of bits can be copied, appended with additional information from the next event, and scrambled again, adding another link to the chain. The result is a transaction authorization artifact with formidable security, becoming more and more impenetrable with every link.

Transaction information elements 107 (functional data elements, in this case, for cash channel transactions) include, for example:

1. Customer: Mountain View Enterprises
2. Customer Bank Account: Bank of the North XXXXXX1111
3. Customer Trading Account: 6789-12345
4. Fund Bank Account: American Security Bank XXXXXX9999
5. Fund: Good as Gold USD Liquidity FundTransaction Date: 14-Dec 2011
6. Transaction Amount: $100M
7. Trader: Louis (Mountain View)
8. Approver: Susan (Mountain View)
9. Verifier: Tom (ICD)
10. Message Channel: ICDFUS65
11. Message Counterparty: GOLDUS01
12. Network: SWIFT™
13. Message Timestamp: 14-Dec 2011 19:01 UTC
14. Rights Profile: Trade
15. Rights Profile: Verify Post-transaction information elements might include:

16. Security: Energy Bond #1
17. Sponsor: Town of Sunnyville
18. Investment Amount: $1M Link Creation Events Links are created by applying a reversible mathematical scrambling algorithm to a set of information. The information is scrambled using the private key of the operator performing an action. The information can be unscrambled only with that operator's public key.

If an attempt at unscrambling is successful, the original information will be restored. Presuming the public key was obtained from a reputable source, the operator's signature will have been verified. With secure chains, a portion of the "original information" may be another, yet smaller scrambled set of information—i.e. the next link up in the chain. Given a sufficient protocol, the public key for unscrambling this next level will also be apparent, and should be easily obtained from another reputable source, and so on, walking up the chain of business events.

Traditional digital signature methods furnish signed and clear text versions of a set of information. The "signatures" applied in creating secure chains need not carry the original clear text version. Instead, at any point in the transaction process, the chain-in-play can be traced back to compare its signed contents with the details of an operator's request, and to send link creation information all the way up to the original link.

Note that most signature methods in use today involve applying a one-way hash function to the original information, and then applying the operator's private key to the hashed version to produce a digital signature. In this context, it is necessary to apply that same hash function to the appropriately formatted details of an operator's request, and then compare the result to the hashed version revealed by unscrambling with the public key. The role of this hash function in the digital signature process has been excluded from the descriptions herein for the sake of brevity and simplicity.

The table below shows one possible set of events related to one hypothetical transaction for one imaginary company, Mountain View Enterprises. The events occur in the context of a money market fund online portal.

| Event/Purpose | Sym | Information Added | Signature |
|---|---|---|---|
| Activate Customer Bank Account | C | 1 Mountain View Enterprises<br>2 Bank of the North XXXXXX1111 | Portal Root |
| Activate Fund Bank Account | F | 4 American Security Bank XXXXXX9999 | Customer Root |
| Bind Cash Channel to Account via grant to Account Master Susan | M | 9 Susan ID<br>3 6789-12345 | Portal Root |
| Propagate Trading Rights to Portal User Louis | U | 8 Louis ID<br>15 Trade | Susan |
| Propagate Verification Rights to ICD Portal Administrator Tom | I | 10 Tom ID<br>16 Verify | Susan |
| Place Trade Request | T | 6 14 Dec. 2011<br>7 $100M | Louis |
| Approve Trade Request | A | 5 Good as Gold USD Liquidity Fund | Susan |
| Verify Trade Request and Engage Counterparty | V | 13 SWIFT<br>11 ICDFUS65<br>12 GOLDUS01 | Tom |
| Send Message | S | 14 14 Dec. 2011 19:01 UTC | SWIFT ™ |
| Invest Proceeds | P | 17 Energy Bond #1<br>18 Town of Sunnyville<br>19 $1M | Good as Gold |

Example Chains

Figure 2A:
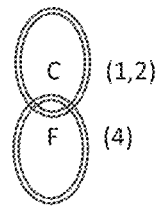
FIG. 2A-2J are examples of security chains that may be created in the system of FIG. 1.
Figure 2B:
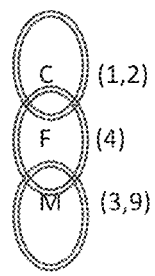
Figure 2C:
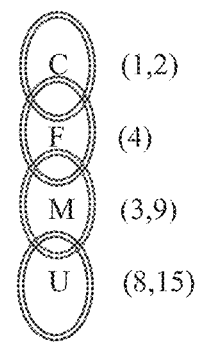
Figure 2D:
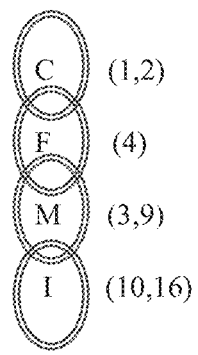
Figure 2E:
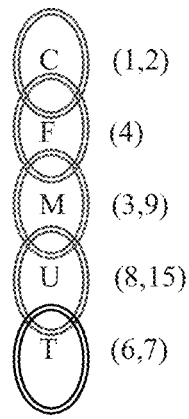
Figure 2F:
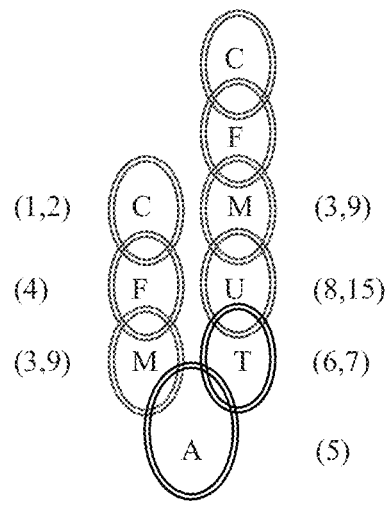
Figure 2G:
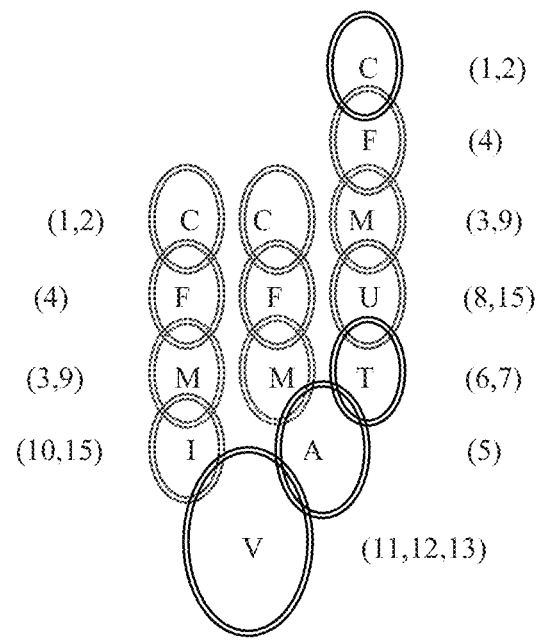
Figure 2H:
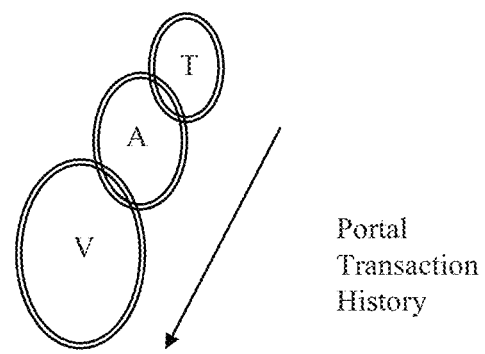
Figure 2I:
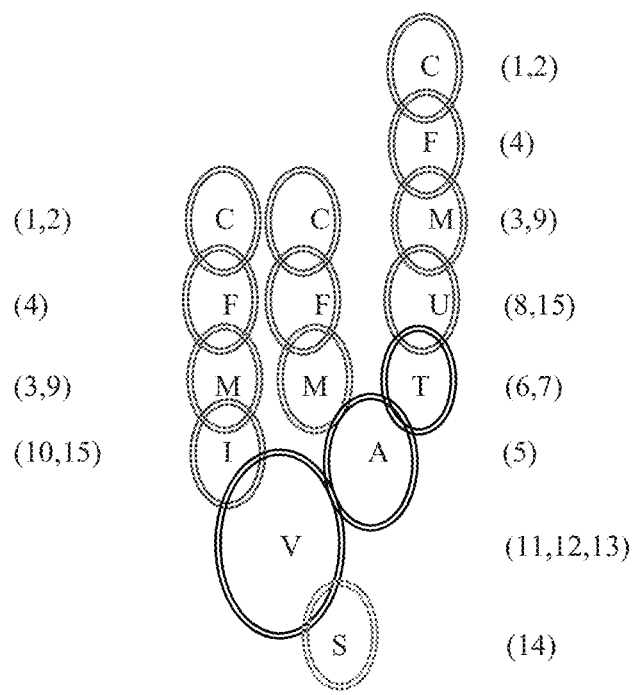
Figure 2J:
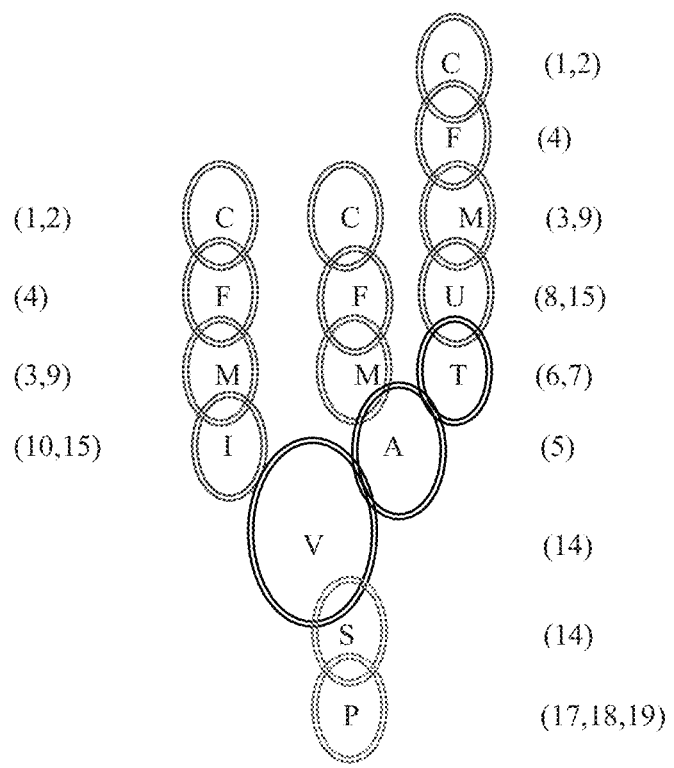

This outline describes one possible set of chains supporting the transaction process. The letters and numbers correspond to the preceding table. The cash channel activation ceremony, involving an authorized portal representative and an authorized Mountain View representative, produces cash channel chain of FIG. 2A by binding a fund bank account identifier link "F" to a "core" customer cash account link "C". A portal Root Administrator identifies Susan from Mountain View as an account master. In doing so, the Administrator produces the account master chain with link "M" shown in FIG. 2B by copying the cash channel chain, and binding it with an Account Master grant to Susan for account 6789-12345. This gives Susan all rights for that trading account, along with authorization to invoke the cash channel. Susan propagates trading rights for account 6789-12345 to Louis, producing the user chain with link "U" shown in FIG. 2C by making a copy of the account master chain and binding it with a trading rights profile grant to Louis. Susan also propagates verification rights for account 6789-12345 to portal Administrator Tom, producing the administrator chain with link "I" in FIG. 2D by making a copy of the account master chain and binding it with a verification rights profile grant to Tom. Louis requests a transaction in the portal, entering an amount and date. This produces the transaction request chain with link "T" in FIG. 2E by making a copy of Louis' user chain, and binding it with his transaction details. Susan approves the transaction request and validates the destination fund. This produces the transaction approval chain of FIG. 2F by binding a copy of Louis' transaction request chain with a copy of Susan's account master chain using an approval link "A". Tom verifies the transaction request, producing the verified transaction chain of FIG. 2G by binding a copy of the transaction approval chain with a copy of his own administrator chain using a verification link "V". FIG. 2H shows the succession of transaction events in the portal, where the link "T" is created first (as shown in FIG. 2E), followed by the link labeled "A" (as shown in FIG. 2F) and then the link labeled "V" (as shown in FIG. 2G). The verified transaction chain then travels with a message engaging the counterparty, as specified in the verification link messaging instructions. The portal's SWIFT™ service bureau delivers the message to the SWIFT™ network, and adds another link "S" to the chain with the message delivery timestamp as shown in FIG. 2I. Critically, before executing the delivery, they were able to unscramble the secure chain to its core, validate the details of the transaction against the information in the chain, and put to rest any questions about its authenticity. The counterparty invests 1% of the transaction proceeds in a municipal energy bond. This adds another link "P" to the chain and sends the investment information all the way up to the top as shown in FIG. 2J.

Chain Variations

Chains can be constructed with many different sequences and combinations of information, based on business rules. In this regard, information can be pushed up the chain to make it more fundamental or permanent. Information can also be pushed down the chain to make it more flexible or variable. In addition, information can be spread over more links to make the chain more secure. Information can also be combined to establish useful associations and the sequence of business events can be adapted to other workflows. Some additional chain variations and associated functionality include the following. Rights can be propagated through multiple levels of users. Information about new links can be propagated up the chain with every operator request. Operator requests also can be made contingent on validation all the way up the chain. Users associated with core links can construct chain proliferation trees based on link information. In addition, Users associated with core links can break their chain proliferation tree at any link, potentially revoking rights for many users. Finally, Users associated with core links can rebuild chain proliferation trees using templates or tree-building scripts that may involve other users, intended specifically for events such as changing a customer bank account or another piece of core information.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for controlling use of a cash channel used for electronic funds transfers, comprising:
  1) constructing a security token that incorporates a first set of first financial transaction elements that are required to control operation of a cash channel, said cash channel involving an origination account from which assets are to be withdrawn and a destination account to which assets are to be deposited, said constructing a security token comprising:
    a) operating a first processing system to generate a first data object including at least a first subset of said first financial transaction elements;
    b) transmitting the first data object, directly or indirectly, from said first processing system to a second processing system;
    c) using the second processing system to generate an at least once-encapsulated cash channel object by encapsulating at least the first data object using a first digital signature system including a first digital signature of a first party, for encapsulating the first data object and a first signature verification for verifying the first signature and de-encapsulating the first data object; and
    d) transmitting the at least once-encapsulated cash channel object to a third processing system; and
    e) operating the third processing system to generate an at least twice-encapsulated cash channel object by adding at least a second subset of said first financial transaction elements, different than said first subset, to said once-encapsulated cash channel object and encapsulating at least the at least once-encapsulated cash channel object and said second subset of said first financial transaction elements using a second digital signature system including a second digital signature of a second party, for encapsulating the at least once-encapsulated cash channel object and said second subset of said first financial transaction elements, and a second signature verification for verifying the second signature and de-encapsulating the at least once-encapsulated cash channel object and said second subset of said first financial transaction elements;
   wherein said security token comprises said at least twice-encapsulated cash channel object; and
  2) using the security token by:
    a) receiving, at a transaction processing system, said security token, including said at least twice-encapsulated cash channel object;
    b) receiving, at said transaction processing system, a cash channel request for withdrawing said assets from said origination account and depositing said assets into— said destination account, said cash channel request comprising a second set of second financial transaction elements;
    c) operating said transaction processing system to use said second signature verification to de-encapsulate said at least twice-encapsulated cash channel object so as to obtain said second subset of said first financial transaction elements;
    d) operating said transaction processing system to use said first signature verification to de-encapsulate said at least once-encapsulated cash channel object to obtain said first subset of said first financial transaction elements; and
    e) comparing, at said transaction processing system, said first financial transaction elements of said security token with said second financial transaction elements of said cash channel request to verify said cash channel request.

2. A method as set forth in claim 1, wherein each of said first and second digital signature systems comprises a public-private key pair having, in each case, a private key for encapsulation and a public key for de-encapsulation.

3. A method as set forth in claim 1, wherein said step of generating a once-encapsulated cash channel object further comprises associating a tag with said once-encapsulated cash channel object, said tag identifying one of said first signature verification, a date and time when said once-encapsulated cash channel object was generated, and contact data for said first one of said first and second parties.

4. A method as set forth in claim 1, wherein one of said first and second parties is a grantor of rights with respect to said cash channel and the other of said first and second parties is a grantee of rights with respect to said cash channel.

5. A method as set forth in claim 1, wherein said cash channel is defined by said first-data object in combination with additional information appended to said first data object prior to encapsulating or further encapsulating said first data object.

6. A method as set forth in claim 1, wherein said constructing said security token further comprises the step of verifying the first data object by de-encapsulating the first data object and confirming the cash channel defined at least in part by the first data object.

7. A method as set forth in claim 1, wherein generating said at least twice-encapsulated cash channel object comprises adding authorization data to a cash channel object including said first data object prior to encapsulating or further encapsulating said cash channel object.

8. A method as set forth in claim 7, wherein said authorization information identifies the first or second party and another party in a chain of propagated rights with respect to said cash channel.

9. A method as set forth in claim 1, wherein said generating said at least twice-encapsulated cash channel object further comprises first propagating authorization with respect to said cash channel by adding first propagation authorization data at least identifying a first authorized user to said twice-encapsulated cash channel object and encapsulating said first propagation authorization data and said twice-encapsulated cash channel object using a third digital signature system to create a first propagated cash channel object, wherein said third digital signature system may be the same as one of said first and second digital signature systems, or may be different from said first and second digital signature systems.

10. A method as set forth in claim 9, wherein said first propagation authorization data defines a first scope of rights of said first authorized user with respect to said cash channel.

11. A method as set forth in claim 9, wherein said generating said at least twice-encapsulated cash channel object further comprises second propagating authorization with respect to said cash channel by adding second propagation authorization data at least identifying a second authorized user to said first propagated cash channel object and encapsulating said second propagation authorization data and first propagated cash channel object using a fourth digital signature system to create a second propagated cash channel data object, wherein said fourth digital signature system may be the same as one of said first and second digital signature systems, or may be different from said first and second digital signature systems.

12. A method as set forth in claim 11, wherein said second propagation authorization data defines a second scope of rights of said second authorized user with respect to said cash channel.

13. A method as set forth in claim 1, wherein said comparing is performed by a processing platform of one of said first and second parties.

14. A method as set forth in claim 1, wherein said processing platform is accessed, to execute said comparing, by an actor, wherein said actor is different than said first and second parties.

15. A method as set forth in claim 1, further comprising:
coupling additional information to said at least twice-encapsulated cash channel object; and
further encapsulating the at least twice-encapsulated cash channel object and said additional information using a further digital signature system including a digital signature for encapsulation and a signature verification for de-encapsulation.

16. A method as set forth in claim 15, wherein the additional information comprises one of a tag identifying one of the first and second signature verification, a date and time said at least twice-encapsulated cash channel object was generated, and contact information for one of said first and second parties, identification information for a trading account, a specification of rights propagated for a trading account or said origination financial account, and an identification of a party to whom rights are being granted.

17. A method as set forth in claim 15, wherein said further digital signature system is associated with a party to whom rights have been granted with respect to said cash channel.

18. A method as set forth in claim 17, further comprising associating a tag with said further encapsulated cash channel object and said additional information, said tag identifying one of the signature verification of said party, a date and time said further cash channel object was generated, and contact information for said party.

19. A method as set forth in claim 1, further comprising:
adding details of a transaction to said—at least twice-encapsulated cash channel object, said transaction involving one of requesting a trade and invoking said cash channel; and
encapsulating said at least twice-encapsulated cash channel object and said transaction details using a digital signature system including a digital signature for encapsulation and a signature verification for de-encapsulation, thereby forming an encapsulated transaction request.

20. A method as set forth in claim 19, further comprising:
executing a transaction using said encapsulated transaction request wherein said encapsulated transaction request is further encapsulated with one or more layers of digital signatures, each said signature layer involving a digital signature system including a digital signature for encapsulation and a signature verification for de-encapsulation; and
said one or more digital signature layers encoding details of subsidiary investments traceable to funds of said transaction and any intervening investments associated with said signature layers.

21. A method as set forth in claim 20, wherein said signature layers pertain to at least a first plurality of intervening investments, traceable to said transaction, having a cumulative initial value substantially equal to a value of said transaction and a terminal value; and a second plurality of investments, collectively traceable to said first plurality of intervening investments and said transaction, having a cumulative initial value substantially equal to said terminal value.

22. A method as set forth in claim 1, wherein rights with respect to said cash channel are propagated across a propagation tree including multiple propagation branches, each propagation branch involving an additional digital signature layer applied to an at least twice-encapsulated cash channel object, each digital signature layer reflecting propagation of rights to a further party and involving a digital signature system including a digital signature for encapsulation and a signature verification for de-encapsulation, said method further including the steps of pruning said propagation of tree by invalidating a signature layer at a selected point in a given branch of said tree, thereby invalidating other signature layers associated with said given branch.

23. A system for controlling use of a cash channel used for electronic funds transfers, comprising:
1) a first processing system, operative for:
a) receiving a first data object including at least a first subset of first financial transaction elements, said first financial transaction elements being required to control operation of a cash channel, said cash channel involving an origination account from which assets are to be withdrawn and a destination account to which assets are to be deposited; and
b) generating an at least once-encapsulated cash channel object by encapsulating at least the first data object using a first digital signature system including a first digital signature of a first party, for encapsulating the first data object and a first signature verification for verifying the first signature and de-encapsulating the first data object; and
2) a second processing system operative for receiving the at least once-encapsulated cash channel object, and:
a) generating an at least twice-encapsulated cash channel object by adding at least a second subset of said first financial transaction elements to said at least once-encapsulated cash channel object and encapsulating at least the at least once-encapsulated cash channel object and said second subset of said first financial transaction elements using a second digital signature system including a second digital signature of a second party, for encapsulating the once-encapsulated cash channel object and a second signature verification for verifying the second signature and de-encapsulating the at least once-encapsulated cash channel object;
wherein said at least twice-encapsulated cash channel object defines a security token; and
3) a transaction processing system operative for:
a) receiving said security token, including said at least twice-encapsulated cash channel object;
b) receiving a cash channel request for withdrawing said assets from said origination account and depositing said assets into said destination account, said cash channel request including a second set of second financial transaction elements;
c) operating said transaction processing system to use said second signature system to de-encapsulate said at least twice-encapsulated cash channel object so as to obtain said second subset of said first financial transaction elements;
d) operating said transaction processing system to use said first signature system to de-encapsulate said at least once-encapsulated cash channel object to obtain said first subset of said first financial transaction elements; and
e) comparing said first transaction elements of said security token with said second financial transaction elements of said cash channel request to verify said cash channel request.

24. A system as set forth in claim 23, wherein each of said first and second digital signature systems comprises a public-private key pair having, in each case, a private key for encapsulation and a public key for de-encapsulation.

25. A system as set forth in claim 23, wherein said generating a once-encapsulated cash channel object further comprises associating a tag with said once-encapsulated cash channel object, said tag identifying one of said first signature verification, a date and time said at least once-encapsulated cash channel object was created, and contact information for one of said first and second parties.

26. A system as set forth in claim 23, wherein one of said first and second parties is a grantor of rights with respect to said cash channel and the other of said first and second parties is a grantee of rights with respect to said cash channel.

27. A system as set forth in claim 23, wherein said cash channel is defined by said first data object in combination with additional information appended to said first data object prior to encapsulating or further encapsulating said first data object.

28. A system as set forth in claim 23, wherein said second processing system is further operative for verifying the first data object by de-encapsulating the first data object and confirming the cash channel defined at least in part by the first data object.

29. A system as set forth in claim 23, wherein said generating an at least twice-encapsulated cash channel object comprises adding authorization data to a cash channel object including said first data object prior to encapsulating or further encapsulating said cash channel object.

30. A system as set forth in claim 28, wherein said authorization data identifies the first or second party and another party in a chain of propagated rights with respect to said cash channel.

31. A system as set forth in claim 23, wherein said generating an at least twice-encapsulated cash channel object further comprises first propagating authorization with respect to said at least cash channel by adding first propagation authorization data at least identifying a first authorized user to said twice-encapsulated cash channel object and encapsulating said first propagation authorization data and said at least twice-encapsulated cash channel object using a third digital signature system to create a first propagated cash channel object, wherein said third digital signature system may be the same as one of said first and second digital signature systems, or may be different from said first and second digital signature systems.

32. A system as set forth in claim 31, wherein said first propagation authorization data defines a first scope of rights of said first authorized user with respect to said cash channel.

33. A system as set forth in claim 31, wherein said generating an at least twice-encapsulated cash channel object further comprises second propagating authorization with respect to said cash channel by adding second propagation authorization data at least identifying a second authorized user to said first propagated cash channel object and encapsulating said second propagation authorization data and first propagated cash channel object using a fourth digital signature system to create a second propagated cash channel data object, wherein said fourth digital signature system may be the same as one of said first and second digital signature systems, or may be different from said first and second digital signature systems.

34. A system as set forth in claim 33, wherein said second propagation authorization data defines a second scope of rights of said second authorized user with respect to said cash channel.

35. A system as set forth in claim 23, wherein said comparing comprises matching at least the destination account of the at least twice-encapsulated cash channel object to the destination account of the request.

36. A system as set forth in claim 35, the comparing is performed by a processing platform of one of said first and second parties.

37. A system as set forth in claim 36, wherein said processing platform is accessed, to execute said matching, by said actor, wherein said actor is different than said first and second parties.

38. A system as set forth in claim 23, further comprising one or more processors are further operative for:
coupling additional information to said at least twice-encapsulated cash channel object; and
further encapsulating the at least twice-encapsulated cash channel object and said additional information using a further digital signature system including a digital signature for encapsulation and a signature verification for de-encapsulation.

39. A system as set forth in claim 38, wherein the additional information comprises one of a tag identifying one of the first and second signature verification, a date and time said at least twice-encapsulated cash channel object was created, contact information for one of said first and second parties, identification information for a trading account, a specification of rights propagated for a trading account or said origination financial account, and an identification of a party to whom rights are being granted.

40. A system as set forth in claim 38, wherein said further digital signature system is associated with a party to whom rights have been granted with respect to said cash channel.

41. A system as set forth in claim 40, wherein said one or more processors are further operative for associating a tag with said further encapsulated cash channel object and said additional information, said tag identifying one of the signature verification of said party, a date and time said further encapsulated cash channel object was established, contact information for one said party.

42. A system as set forth in claim 23, wherein said one or more processors are further operative for:

adding details of a transaction to said—at least twice-encapsulated cash channel object, said transaction involving one of requesting a trade and invoking said cash channel; and encapsulating said at least twice-encapsulated cash channel object and said transaction details using a digital signature system including a digital signature for encapsulation and a signature verification for de-encapsulation, thereby forming an encapsulated transaction request.

43. A system as set forth in claim 42, wherein said one or more processors are further operative for:

executing a transaction using said encapsulated transaction request wherein said encapsulated transaction request is further encapsulated with one or more layers of digital signatures, each said signature layer involving a digital signature system including a digital signature for encapsulation and a signature verification for de-encapsulation; said one or more digital signature layers encoding details of subsidiary investments traceable to funds of said transaction and any intervening investments associated with said signature layers.

44. A system as set forth in claim 43, wherein said signature layers pertain to at least a first plurality of intervening investments, traceable to said transaction, having a cumulative initial value substantially equal to a value of said transaction and a terminal value; and a second plurality of investments, collectively traceable to said first plurality of intervening investments and said transaction, having a cumulative initial value substantially equal to said terminal value.

45. A system as set forth in claim 23, wherein rights with respect to said cash channel are propagated across a propagation tree including multiple propagation branches, each propagation branch involving an additional digital signature layer applied to an at least twice-encapsulated cash channel object, each digital signature layer reflecting propagation of rights to a further party and involving a digital signature system including a digital signature for encapsulation and a signature verification for de-encapsulation, said system further including the steps of pruning said propagation of tree by invalidating a signature layer at a selected point in a given branch of said tree, thereby invalidating other signature layers associated with said given branch.

* * * * *